United States Patent [19]

Cho

[11] Patent Number: 5,666,245
[45] Date of Patent: Sep. 9, 1997

[54] HEAD DRUM ASSEMBLY PROVIDED WITH AN AMPLIFIER THEREIN

[75] Inventor: Bu-Hyun Cho, Seoul, Rep. of Korea

[73] Assignee: Daewoo Electronics Co., Ltd., Seoul, Rep. of Korea

[21] Appl. No.: 566,630

[22] Filed: Dec. 4, 1995

[30] Foreign Application Priority Data

Feb. 15, 1995 [KR] Rep. of Korea ............... 95-2357

[51] Int. Cl.$^6$ .................................................. G11B 5/52
[52] U.S. Cl. .......................... 360/108; 360/84; 360/130.24
[58] Field of Search ........................ 360/84, 108, 130.24

[56] References Cited

U.S. PATENT DOCUMENTS

| | | | |
|---|---|---|---|
| 4,517,615 | 5/1985 | Hino | 360/108 |
| 4,706,144 | 11/1987 | Asada et al. | 360/130.24 |
| 4,835,645 | 5/1989 | Ohji et al. | 360/108 |
| 5,321,569 | 6/1994 | Sakai | 360/108 |
| 5,325,248 | 6/1994 | Tabuchi et al. | 360/108 X |
| 5,363,263 | 11/1994 | Ohji et al. | 360/108 |

*Primary Examiner*—John H. Wolff
*Attorney, Agent, or Firm*—Anderson Kill & Olick P.C.

[57] ABSTRACT

A head drum assembly for use in a video cassette recorder ("VCR") includes a rotary drum, a stationary drum, a rotary transformer including a rotor and a stator transformers, and an amplifier. The amplifier is mounted onto an inner bottom surface of the stationary drum and is electrically connected to a second winding coils of the stator transformer.

3 Claims, 2 Drawing Sheets

HEAD DRUM ASSEMBLY PROVIDED WITH AN AMPLIFIER THEREIN

FIELD OF THE INVENTION

The present invention relates to a head drum assembly for use in a video cassette recorder ("VCR"); and, more particularly, to an improved head drum assembly capable of preventing a noise.

DESCRIPTION OF THE PRIOR ART

As shown in FIG. 1, a conventional head drum assembly for use in a VCR normally comprises a rotating shaft 1, a rotary drum 2, a stationary drum 3, a plurality of heads 4, a rotary transformer 5 having a rotor and a stator transformers 6, 7, an amplifier 8, and a brush 9.

The rotary drum 2 is secured on an upper portion of the rotating shaft 1, rotating therewith.

The stationary drum 3 is adjoined to a lower portion of the rotating shaft 1 through, e.g., two sets of bearings (not shown), and is fixed on a main plate (not shown) of the VCR.

The plurality of heads 4 are secured to the rotary drum 2 by using a plurality of fastening screws (not shown), and read video or audio signals already recorded on a magnetic tape (not shown) or record new signals on the tape.

The rotor and stator transformers 6, 7 are attached at a bottom surface 2a of the rotary drum 2 and at an inner bottom surface 3a of the stationary drum 3 by using, e.g., an adhesive, respectively.

In addition, the rotor and the stator transformers 6, 7 include a surface with a plurality of first grooves 6a carved therein and a surface with a plurality of second grooves 7a carved therein, respectively. The surfaces of the rotor and the stator transformers 6, 7 face each other and maintain a desired gap therebetween. A plurality of first and second winding coils 6b, 7b are wound into the grooves 6a, 7a, respectively. The rotor and the stator transformer 6, 7 are intended to transmit the signals between the rotary and the stationary drums 2, 3.

The amplifier 8, which is normally provided with a printed circuit board ("PCB") (not shown) containing a plurality of electrical components (not shown), is securely attached on a top surface 2b of the rotary drum 2, and is electrically connected to the heads 4 and the first winding coils 6b of the rotor transformer 6.

The brush 9 is electrically connected to the amplifier 8, and is used to apply an electric power thereto.

In such a head drum assembly, for instance, during a reproducing operation of the VCR, the amplifier 8 receives and amplifies a signal read by each of the heads 4 and transmits it to the corresponding first winding coil 6b of the rotor transformer 5. The signal transmitted to the first winding coil 6b induces a corresponding signal in the corresponding second winding coil 7b of the stator transformer 7. The induced signal is, then, transmitted to a signal processing part on a main PCB (not shown) incorporated in the VCR.

However, in such a conventional head drum assembly, a noise is likely to occur since the amplifier 8 is exposed to a number of ambient electrical disturbances, e.g., electric waves from other electric devices.

SUMMARY OF THE INVENTION

It is, therefore, a primary object of the present invention to provide a head drum assembly capable of preventing a noise.

In accordance with the present invention, there is provided a head drum assembly for use in a video cassette recorder ("VCR") including a rotary drum having a bottom surface, a stationary drum, a rotary transformer including a rotor and a stator transformers having a plurality of first and second winding coils, respectively, and an amplifier, the head drum assembly being characterized in that: the stationary drum is provided with an inner top surface and an inner bottom surface; the rotor and the stator transformers are mounted on the bottom surface of the rotary drum and the inner top surface of the stationary drum, respectively; and the amplifier is mounted onto the inner bottom surface of the stationary drum and is electrically connected to the second winding coils of the stator transformer.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 2A:
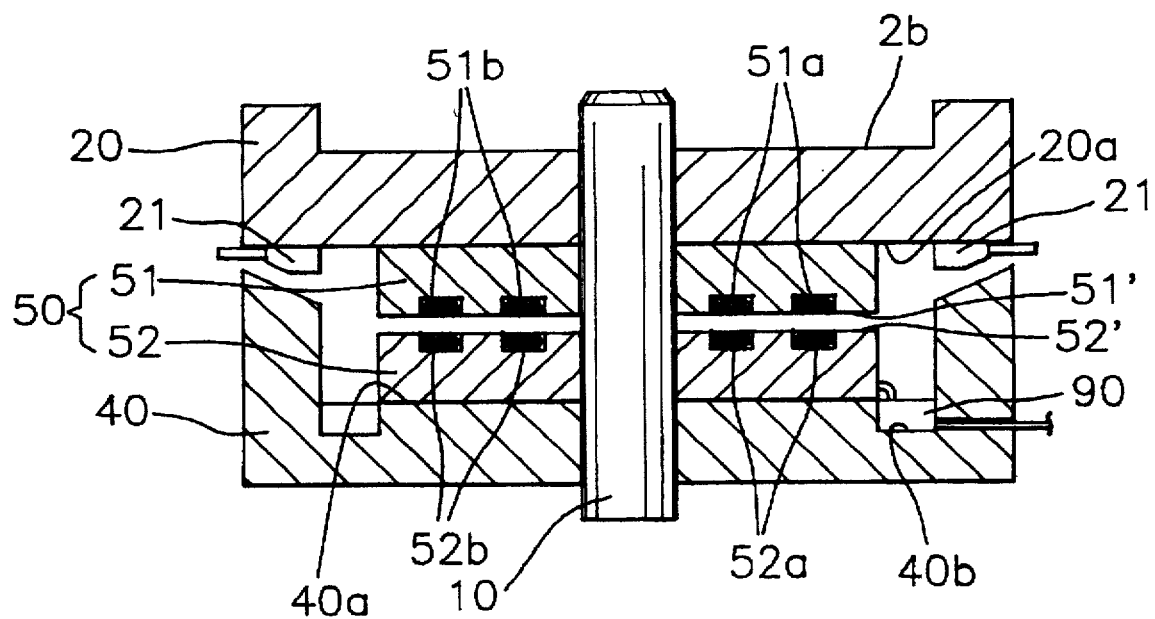
FIG. 2A represents a schematic cross-sectional view of a preferred embodiment of a head drum assembly in accordance with the present invention.

There is shown in FIG. 2A a preferred embodiment of an inventive head drum assembly for use in a VCR in accordance with the present invention.

The inventive head drum assembly includes a rotating shaft 10, a rotary drum 20 having a bottom surface 20a, a plurality of heads 21, a stationary drum 40 having an inner top surface 40a and an inner bottom surface 40b, a rotary transformer 50 having a rotor transformer 51 and a stator transformer 52, and an amplifier 90.

The rotary drum 20 is secured on an upper portion of the rotating shaft 10, rotating therewith.

The stationary drum 40 is adjoined to a lower portion of the rotating shaft 10 through, e.g., two sets of bearings (not shown), and is fixed on a main plate (not shown) of the VCR.

The plurality of heads 21 are secured to the rotary drum 20 by using a plurality of fastening screws (not shown), and read video or audio signals recorded on a magnetic tape (not shown) running in the VCR or record new signals on the tape.

The rotor and stator transformers 51, 52 are attached at the bottom surface 20a of the rotary drum 20 and at the inner top surface 40a of the stationary drum 40 by using, e.g., an adhesive, respectively.

In addition, the rotor and the stator transformers 51, 52 include a lower surface 51' with a plurality of first grooves 51a carved therein and an upper surface 52' with a plurality of second grooves 52a carved therein, respectively. The surfaces 51', 52' of the rotor and the stator transformers 51, 52 face each other with a predetermined gap therebetween. A plurality of first and second winding coils 51b, 52b are wound onto the grooves 51a, 52a, respectively. The rotor and the stator transformer 51, 52 are intended to transmit the signals between the rotary and the stationary drums 20 and 40.

The amplifier 90, which is normally provided with a printed circuit board ("PCB") (not shown) containing a plurality of electrical components (not shown), is securely mounted onto the inner bottom surface 40b of the stationary drum 40, and is electrically connected to the second winding coils 52b of the stator transformer 52 and a main PCB (not shown) incorporated in the VCR.

Furthermore, the amplifier 90 receives and amplifies the signals from the second winding coils 52b of the stator transformer 52 and transmits them to a signal processing part on the main PCB or vice versa.

Figure 1:
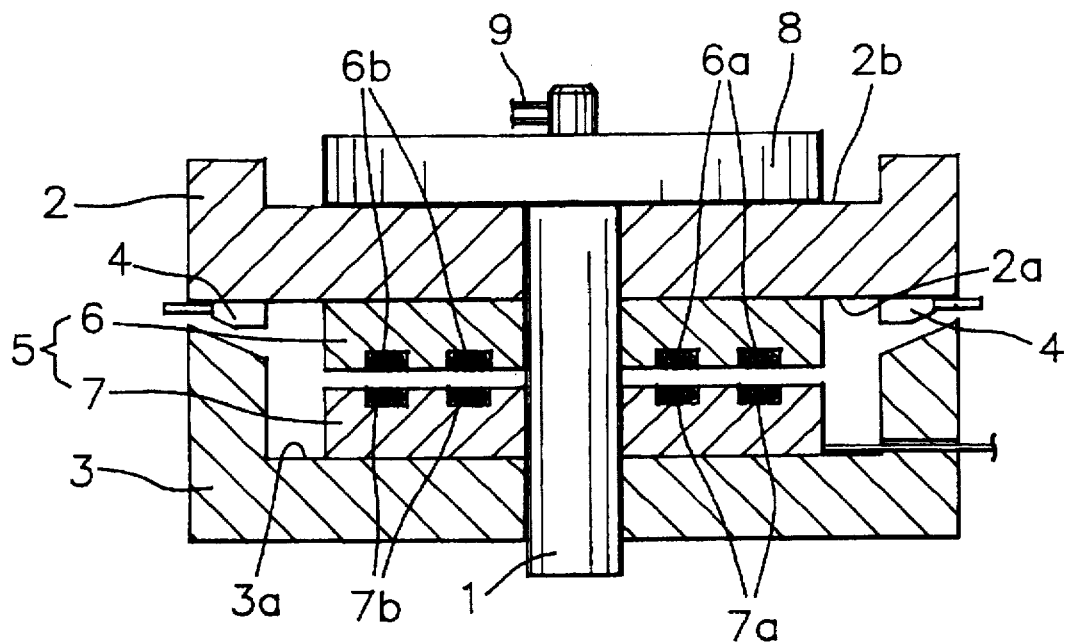
FIG. 1 shows a schematic cross-sectional view of the conventional head drum assembly.

In the present invention, an electric power can be supplied to the amplifier 90 without using the brush 9 (see FIG. 1) in the prior art since the amplifier 90 does not rotate.

Figure 2B:
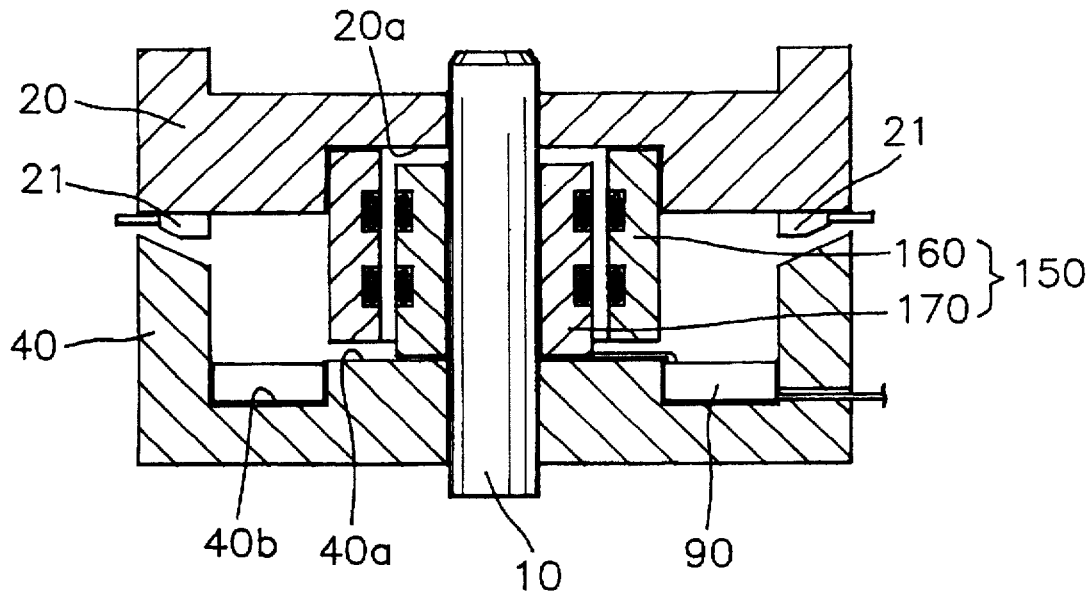
FIG. 2B presents a schematic cross-sectional view of another preferred embodiment of a head drum assembly in accordance with the present invention.

On the other hand, the head drum assembly in accordance with another preferred embodiment of the present invention incorporates, instead of the rotary transformer 50 as shown in FIG. 2A, a well-known cylindrical-type rotary transformer 150 including a cylindrical rotor and a cylindrical stator transformers 160 and 170 as shown in FIG. 2B in order to enlarge an area of the inner bottom surface 40b of the stationary drum 40 onto which the amplifier 90 is mounted.

Figure 2C:
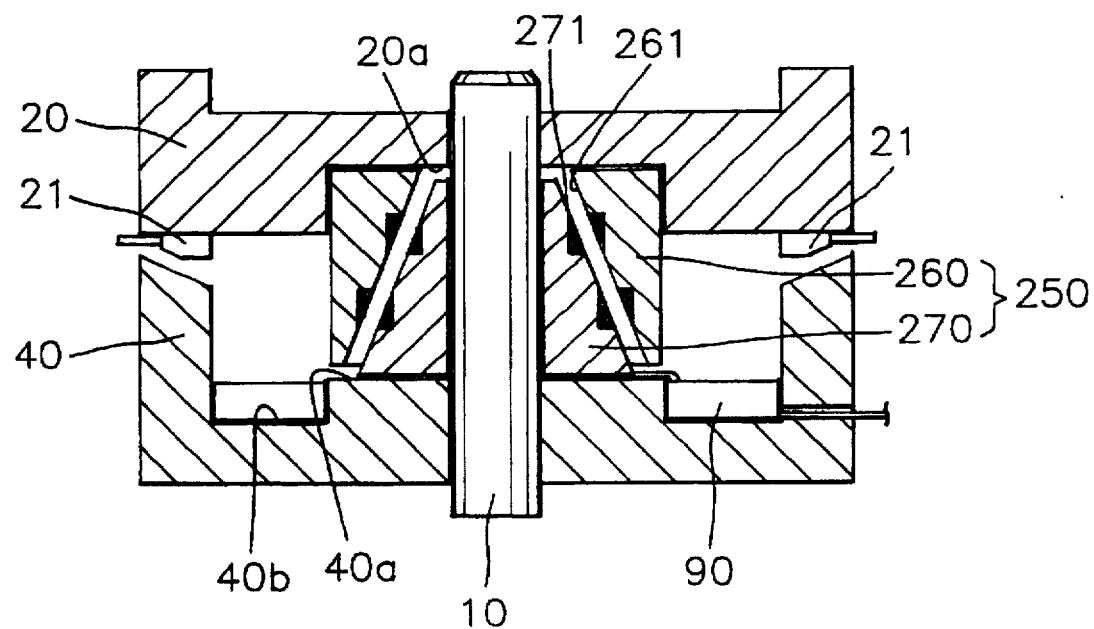
FIG. 2C depicts a schematic cross-sectional view of further another preferred embodiment of a head drum assembly in accordance with the present invention.

In addition, the head drum assembly in accordance with further another preferred embodiment of the present invention incorporates another cylindrical-type rotary transformer 250, as shown in FIG. 2C, including a rotor and a stator transformers 260, 270 having an inner surface 261 and an outer surface 271 tapered upward along a central axis, respectively. The cylindrical-type rotary transformer 250 is disclosed in detail in a copending commonly owned application, U.S. Ser. No. 08/563,169, entitled "CYLINDRICAL-TYPE ROTARY TRANSFORMER", which is incorporated herein by reference.

With the head drum assemblies in accordance with the present invention, it is possible to prevent a noise from occurring since the stationary drum 40 shields the amplifier 90 from the ambient electrical disturbances.

Although the invention has been shown and described with respect to the preferred embodiments, it will be understood by those skilled in the art that various changes and modifications may be made without departing from the spirit and scope of the invention as defined in the following claims.

What is claimed is:

1. A head drum assembly for use in a video cassette recorder ("VCR") including a rotary drum having a bottom surface, a stationary drum, a rotary transformer including a rotor and a stator transformers having a plurality of first and second winding coils, respectively, and an amplifier, said head drum assembly being characterized in that:

the stationary drum is provided with an inner top surface and an inner bottom surface;

the rotor and the stator transformers are mounted on the bottom surface of the rotary drum and the inner top surface of the stationary drum, respectively; and the amplifier is mounted onto the inner bottom surface of the stationary drum and is electrically connected to the second winding coils of the stator transformer.

2. The head drum assembly as recited in claim 1, wherein the rotary transformer is of a cylindrical-type.

3. The head drum assembly as recited in claim 2, wherein the cylindrical-type rotary transformer includes a rotor and a stator transformers having an inner and an outer surfaces, respectively, the inner and the outer surfaces being tapered upward, along the central axis of the rotary transformer.

* * * * *